US008335288B2

United States Patent
Sakata et al.

(10) Patent No.: US 8,335,288 B2
(45) Date of Patent: Dec. 18, 2012

(54) COMMUNICATION METHOD, SYSTEM, TRANSMITTER, AND RECEIVER

(75) Inventors: Ren Sakata, Kanagawa (JP); Tazuko Tomioka, Kanagawa (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 803 days.

(21) Appl. No.: 12/489,764

(22) Filed: Jun. 23, 2009

(65) Prior Publication Data

US 2010/0081386 A1  Apr. 1, 2010

(30) Foreign Application Priority Data

Sep. 26, 2008 (JP) ................................. 2008-248327

(51) Int. Cl.
H04L 7/00 (2006.01)
H04B 1/7087 (2011.01)
(52) U.S. Cl. ........................................ 375/354; 375/145
(58) Field of Classification Search .................. 375/354, 375/364, 368, 141, 145, 149, 150
See application file for complete search history.

(56) References Cited

U.S. PATENT DOCUMENTS

| 2003/0016701 A1* | 1/2003 | Hinson | 370/480 |
| 2008/0153553 A1 | 6/2008 | Horiguchi et al. | 455/567 |
| 2008/0175336 A1 | 7/2008 | Sakata | 375/303 |

FOREIGN PATENT DOCUMENTS

JP  2008-177914 A  7/2008

OTHER PUBLICATIONS

Taira, et al., "A Timing Synchronization Scheme for OFDM in Freuqency Selective Fading Environment", vol. J84-B, No. 7, pp. 1255-1264, Jul. 2001.

* cited by examiner

Primary Examiner — Kevin Kim
(74) Attorney, Agent, or Firm — Ohlandt, Greeley, Ruggiero & Perle, L.L.P.

(57) ABSTRACT

In a method for communication, first and second signals for timing synchronization are generated. Frequencies of the first and second signals are converted to other frequencies to obtain a first and second RF signals, which have a specific frequency gap therebetween. The first and second RF signals are combined to obtain a transmission signal, and the transmission signal is transmitted. When the transmission signal is received as a received signal, the frequency of the received signal is shifted by the specific frequency gap to obtain a converted signal. A complex conjugation of the converted signal calculated to obtain a complex conjugation signal. The received signal and the complex conjugation signal are multiplied to obtain a multiplication signal to calculate cross-correlation between a product of the first and second signals and the multiplication signal. A peak of the cross-correlation is detected to set a base time for timing synchronization.

15 Claims, 8 Drawing Sheets

SAMPLE NUMBER OF THE RECEIVED SIGNAL

SAMPLE NUMBER OF THE RECEIVED SIGNAL

SAMPLE NUMBER OF THE RECEIVED SIGNAL

SAMPLE NUMBER OF THE RECEIVED SIGNAL

COMMUNICATION METHOD, SYSTEM, TRANSMITTER, AND RECEIVER

CROSSREFERENCE TO RELATED APPLICATIONS

This application is based upon and claims the benefit of priority from the prior Japanese Patent Application No. 2008-248327, filed on Sep. 26, 2008, the entire contents of which are incorporated herein by reference.

BACKGROUND OF THE INVENTION

1. Field of the Invention

The present invention relates to a timing synchronization method in a communication system.

2. Description of the Related Art

In general, a timing synchronization method between a transmitter and a receiver is required to receive signals correctly at the receiver in a radio communication system. Especially, in distributed networks like cognitive radio systems, because a receiver does not know when a transmitter will start to send a signal, the receiver needs to acquire a start timing of a transmitted signal for synchronization with the transmitter during receiving the transmitted signal. One of the conventional timing synchronization methods is disclosed by Taira Akinori, Ishizui Fumio and Miyake Makoto, "A Timing Synchronization Scheme for OFDM in Frequency Selective Fading Environment", The transactions of the Institute of Electronics, Information and Communication Engineers B, Vol. J84-B, No. 7, pp. 1255-1264 (2001). In this reference, a receiver uses a matched filter to acquire a start timing of transmitted signal.

Before starting a communication, a transmitter and a receiver negotiate a signal sequence which has a high auto-correlation with its own signal and low cross-correlations with other signal sequences. Moreover, the transmitter and the receiver also negotiate a specified frequency which is used for transmission of the signal sequence preliminarily. The transmitter transmits the signal sequence using the specified frequency. In the receiver, the matched filter has a tap coefficient corresponding to the signal sequence. When the receiver receives a signal corresponding to the signal sequence, a power level of an output signal from the matched filter indicates high. Therefore, the receiver acquires a start timing of transmitted signal by the matched filter.

In this method, the receiver needs to know the specified frequency to transmit a signal preliminarily. If the receiver knows the specified frequency, this method can establish a timing synchronization between the transmitter and the receiver. The precision of the timing synchronization is equal to a reciprocal of a bandwidth of the spread code. However, in the cognitive radio systems, a transmitter selects a specific frequency which is currently not used to send a signal on every transmission. Therefore, it is difficult for a receiver to predict which frequency is used to send a signal from the transmitter on each transmission.

On the other hand, another conventional timing synchronization method is disclosed in JP-A 2008-177914(KOKAI). This method does not need a negotiation of a specified frequency to transmit a signal between a transmitter and a receiver. According to the method, the transmitter transmits a data signal which is spread by a spread code with using a frequency. The transmitter also transmits the spread code with using another frequency. Both frequencies are Δf apart. The receiver shifts the frequencies of the received signals by the frequency gap of Δf, and multiplies it with the received signal itself. Then, the receiver obtains a de-spread signal at DC. In this method, the receiver can demodulate the received signal without information of the specified frequency, only with the frequency gap of Δf.

However, while the received signal has a wide bandwidth because it is spread by the spread code, the signal at DC has a narrow bandwidth because it is de-spread. If the receiver tries to establish a timing synchronization by using the de-spread signal, the precision of the timing synchronization is low. Therefore, the precision is rougher than the time duration of a symbol in signal of spread code.

SUMMARY OF THE INVENTION

According to one aspect of the invention, a method for communication includes: generating a first signal for timing synchronization; generating a second signal for timing synchronization, which is different from the first signal; converting frequencies of the first signal and the second signal to other frequencies to obtain a first RF signal and a second RF signal, which have a specific frequency gap therebetween; combining the first RF signal and the second RF signal to obtain a transmission signal; transmitting the transmission signal; receiving the transmission signal as a received signal; shifting the frequency of the received signal by the specific frequency gap to obtain a converted signal; calculating a complex conjugation of the converted signal to obtain a complex conjugation signal; multiplying the received signal and the complex conjugation signal to obtain a multiplication signal; calculating cross-correlation between a product of the first and second signals and the multiplication signal; and detecting a peak of the cross-correlation to set a base time for timing synchronization.

According to another aspect of the invention, a method for communication, a signal including a header and a payload, includes: generating a first signal for timing synchronization; generating a second signal for timing synchronization, which is different from the first signal; generating a data signal; multiplying the second signal and the data signal to obtain a spread data sequence; selecting the second signal during a period of the header for synchronization, and the spread data sequence during the period of the payload as a selected signal; converting a frequency of the first signal to another frequency to obtain a first RF signal; converting a frequency of the selected signal to another frequency to obtain a second RF signal which has a specific frequency gap with the first RF signal; combining the first RF signal and the second RF signal to obtain a transmission signal; transmitting the transmission signal; receiving the transmission signal as a received signal; shifting the frequency of the received signal by the specific frequency gap to obtain a converted signal; calculating a complex conjugation of the converted signal to obtain a complex conjugation signal; multiplying the received signal and the complex conjugation signal to obtain a multiplication signal; calculating cross-correlation between a product of the first and second signals and the multiplication signal; detecting a peak of the cross-correlation to set a base time for timing synchronization, and other peaks of the cross-correlation around the peak of the base time for timing synchronization; combing the plural peaks of the cross-correlation to obtain a rake combined signal; and demodulating the rake combined signal to obtain the data signal.

DETAILED DESCRIPTION OF THE INVENTION

The embodiments will be explained with reference to the accompanying drawings.

Description of the First Embodiment

Figure 1:
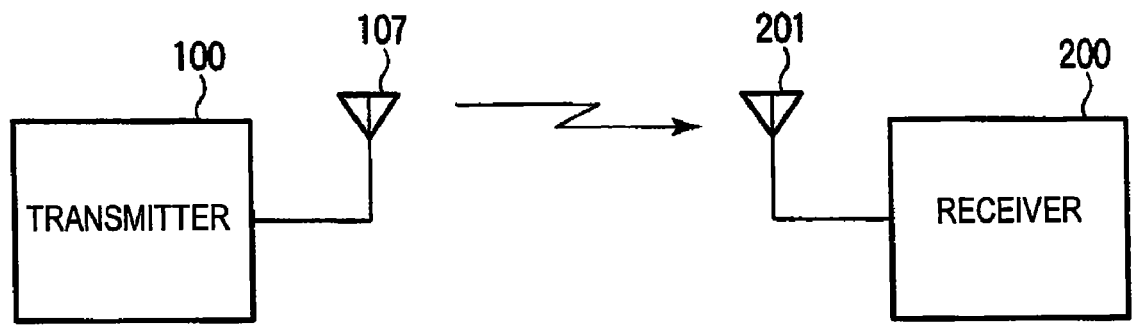
FIG. 1 is a block diagram showing a radio communication system.

As shown in FIG. 1, the radio communications system according to the first embodiment includes a radio transmitter 100 (hereinafter, referred to as "transmitter") and a radio receiver 200 (hereinafter, referred to as "receiver"). The transmitter 100 transmits a specific signal (referred to as "timing synchronization signal") from an antenna 107 for timing synchronization between the transmitter 100 and the receiver 200. In the first embodiment, the timing synchronization signal is determined preliminarily between the transmitter 100 and the receiver 200.

On the other hand, the frequency which is used to transmit a timing synchronization signal is variable. The transmitter 100 selects a frequency which is currently not used to send a signal on each transmission. Therefore, the receiver 200 has no idea which frequency is used to send a signal from the transmitter 100.

The receiver 200 receives the timing synchronization signal at an antenna 201. The receiver 200 tries to synchronize with the transmitter 100 by acquiring the timing synchronization signal.

Figure 2:
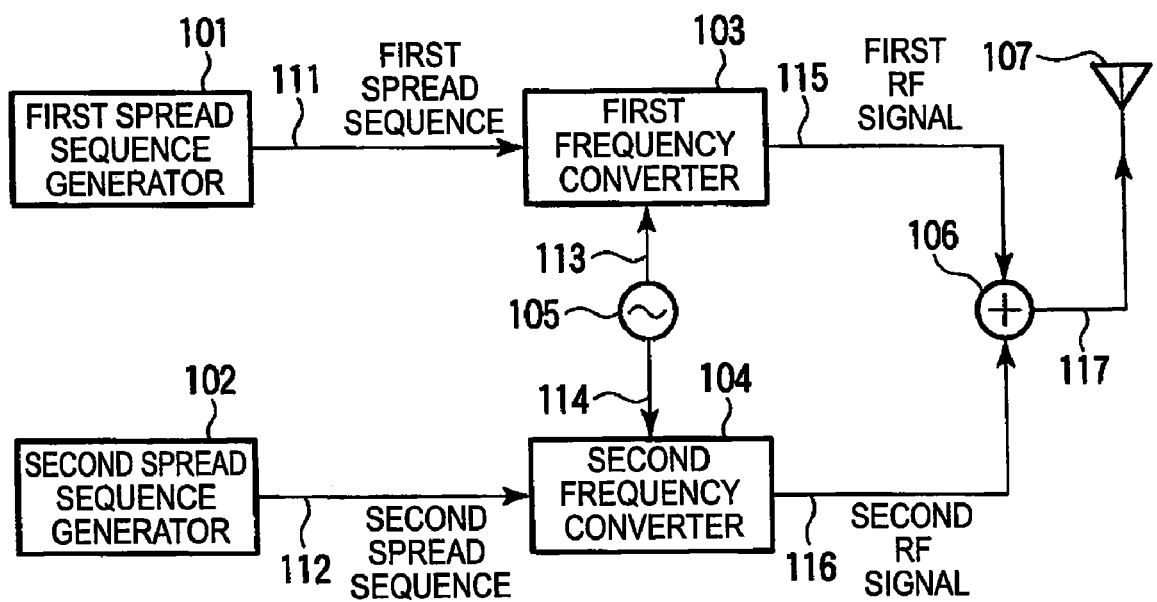
FIG. 2 is a block diagram showing a radio transmitter according to the first embodiment.

As shown in FIG. 2, a transmitter 100 has a first spread sequence generator 101, a second spread sequence generator 102, a first frequency converter 103, a second frequency converter 104, a local oscillator 105, and a combiner 106.

The first spread sequence generator 101 generates a first spread sequence 111 for timing synchronization. The second spread sequence generator 102 generates a second spread sequence 112 for timing synchronization. The first spread sequence 111 is different from the second spread sequence 112. The first spread sequence 111 is not a special sequence, but may be any sequences such as pseudo random sequences and sine wave. In the first embodiment, the first spread sequence 111 and the second spread sequence 112 are pseudo random sequences modulated by BPSK (Binary Phase Shift Keying).

The first spread sequence 111 and a first local signal 113 from the local oscillator 105 are input into the first frequency converter 103. The first frequency converter 103 converts the frequency of the first spread sequence 111 to a specific transmission frequency f1 with using the first local signal 113. Then the first frequency converter 103 outputs a first RF signal 115 with a specific transmission frequency f1. Similarly, the second spread sequence 112 and a second local signal 114 from the local oscillator 105 are input into the second frequency converter 104. The second frequency converter 104 converts the frequency of the second spread sequence 112 to a specific transmission frequency f2 with using the second local signal 114. Then the second frequency converter 104 outputs a second RF signal 116 with a specific transmission frequency f2. The first frequency converter 103 and the second frequency converter 104 are synchronized. The specific transmission frequencies f1 and f2 are apart with a specific frequency gap of $\Delta f (=f2-f1)$.

The first frequency converter 103 and the second frequency converter 104 may have mixers. The local oscillator 105 supplies the first and second local signals 113, 114 to the first and second frequency converters 103, 104, respectively. A frequency gap between the first and second local signals 113, 114 is $\Delta f$. Or the second frequency converter 104 may has a signal generator of a frequency $\Delta f$ and a mixer. In this case, the local oscillator 105 supplies a same common local signal to the first and second frequency converters 103, 104. The first frequency converter 103 may use the common local signal instead of the first local signal 113. On the other hand, the second frequency converter 104 may use a mixed signal of the common local signal and a signal of a frequency $\Delta f$ instead of the second local signal 114.

Figure 3:
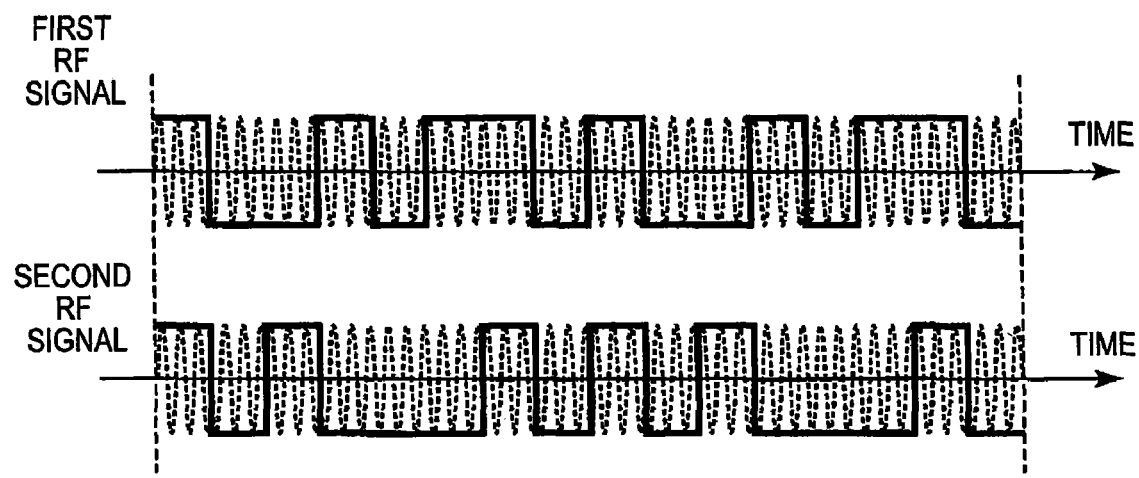
FIG. 3 is a diagram showing a time waveform of the 1st and 2nd RF signal in a transmitted signal from the transmitter shown in FIG. 2, and showing the 1st and 2nd spread sequences.

Dotted lines in FIG. 3 show an example of the first RF signal 115 from the first frequency converter 103 and the second RF signal 116 from the second frequency converter 104. Solid lines in FIG. 3 show signals corresponding to the first spread sequence 111 and the second spread sequence 112.

The combiner 106 combines the first RF signal 115 of the frequency f1 and the second RF signal 116 of the frequency f2. Then, the combiner 106 generates a transmission signal 117 which has two frequency spectrums. In the first embodiment, the transmission signal 117 is the timing synchronization signal. The transmission signal 117 is supplied to the antenna 107 and transmitted as a radio wave.

Figure 4:
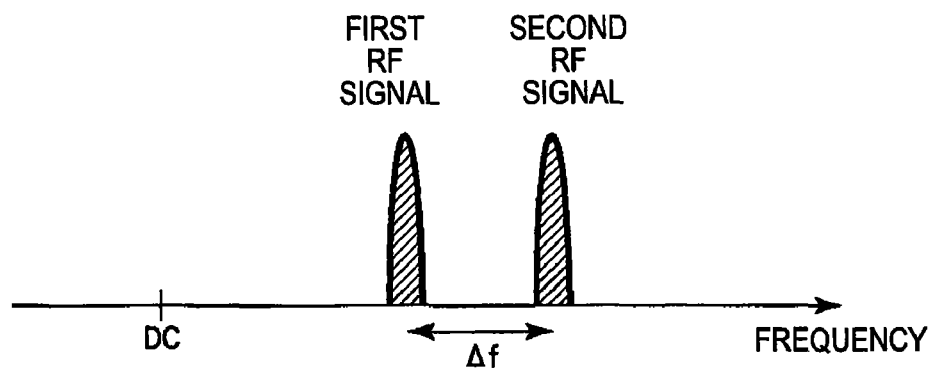
FIG. 4 is a diagram showing a frequency spectrum of a transmitted signal from the transmitter shown in FIG. 2.

As shown in FIG. 4, the spectrums of the transmission signal 117 include two BPSK signals. These two BPSK signals are $\Delta f$ apart in frequency. Since, the first RF signal 115 and the second RF signal 116 are modulated by BPSK, these two BPSK signals correspond to the first RF signal 115 and the second RF signal 116, respectively. These two RF signals 115, 116 are transmitted simultaneously.

Figure 5:
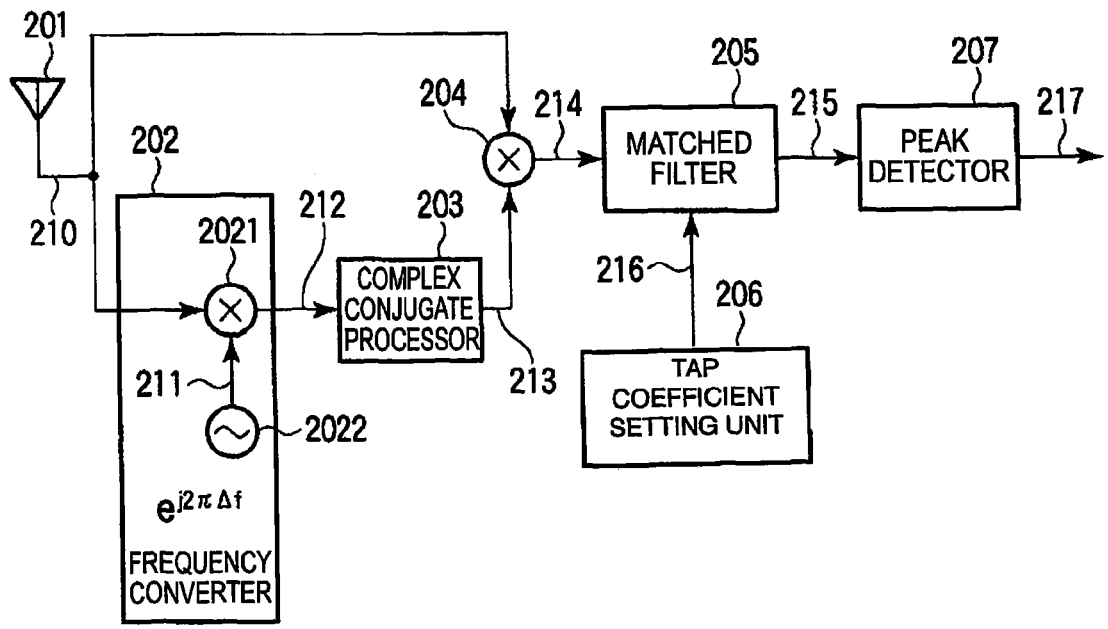
FIG. 5 is a block diagram showing a radio receiver according to the first embodiment.

Next, the receiver 200 will be described. As shown in FIG. 5, the receiver 200 includes an antenna 201, a frequency converter 202, a complex conjugate processor 203, a multiplier 204, a matched filter 205, a tap coefficient setting unit 206, and a peak detector 207.

The antenna 201 receives the transmission signal 117 from the transmitter 100. The frequency converter 202 converts a frequency of the received signal 210 from the antenna 201 to another frequency shifted the frequency of the received signal 210 by $\Delta f$. The frequency converter 202 has a mixer 2021 and a local oscillator 2022. The local oscillator 2022 generates a local signal 211 which is used to shift a frequency of the received signal 210 by Δf at the mixer 2021.

The frequency of the local signal 211 from the local oscillator 2022 equals to a frequency gap of Δf between the frequency f1 of the first RF signal 115 and the frequency f2 of the second RF signal 116. Both first and second RF signal 115, 116 are included in the transmission signal 117 from the transmitter 100. The local signal 211 may be a sine wave of a frequency Δf, which is expressed as $e^{j2\pi\Delta f}$. The frequencies of the first RF signal 115, the second RF signal 116 and the local signal 211 are f1, f2 and Δf, respectively. By multiplying these three signals, the mixer 2021 generates a converted signal 212 which has two frequencies of f2 and f2+Δf. The converted signal 212 is output from the frequency converter 202.

The converted signal 212 from the frequency converter 202 is input into the complex conjugate processor 203. The complex conjugate processor 203 generates a complex conjugation signal 213 by calculating a complex conjugation of the converted signal 212. The complex conjugation signal 213 has a reversed sign in the imaginary part of the converted signal 212. For example, the converted signal 212 expressed as $e^{j2\pi f2}$ is converted to the complex conjugation signal 213 expressed as $e^{-j2\pi f2}$ by the complex conjugate processor 203.

Figure 6:
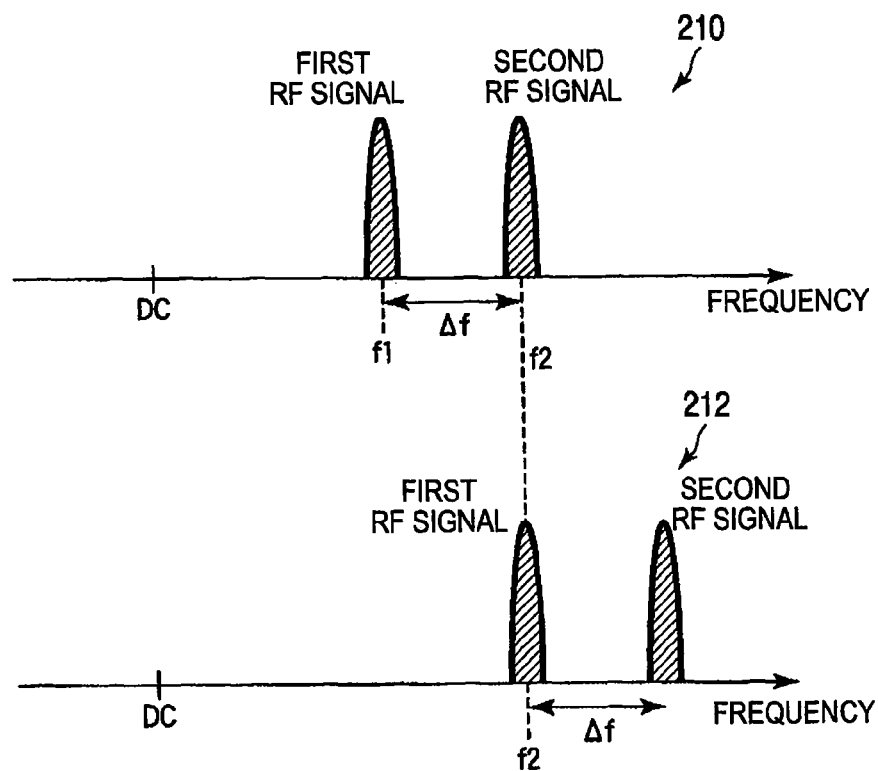
FIG. 6 is a diagram showing frequency spectrums of a received and shifted signals generated in the receiver shown in FIG. 5.

The multiplier 204 multiplies the received signal 210 from the antenna 201 and the complex conjugation signal 213 from the complex conjugate processor 203. As shown in FIG. 6, a frequency gap between the received signal 210 and the converted signal 212 from the frequency converter 202 is Δf. In FIG. 6, the second RF signal included in the received signal 210 and the first RF signal included in the converted signal 212 are both located at frequency f2. After the converted signal 212 is converted to the complex conjugation signal 213 in the complex conjugate processor 203, the received signal 210 and the complex conjugation signal 213 are multiplied in the multiplier 204. As a result, the multiplier 204 outputs a multiplication signal 214 which includes the product of the first and second RF signals 115, 116 at DC.

Figure 7:
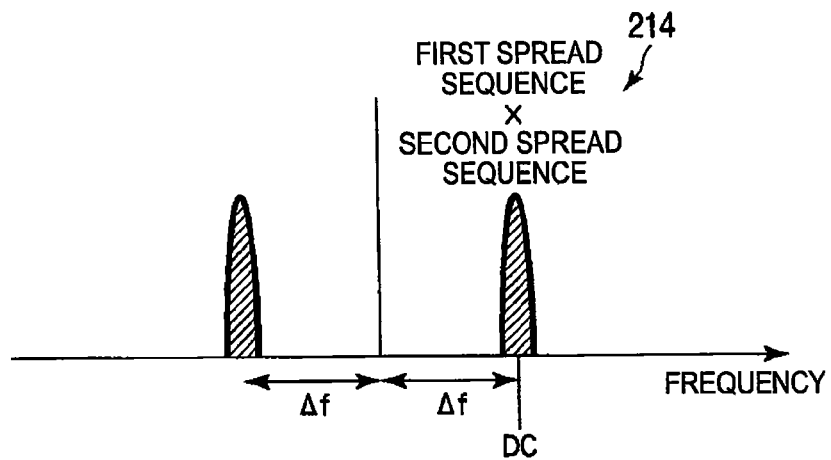
FIG. 7 is a diagram showing a frequency spectrum of a multiplication signal generated in the receiver shown in FIG. 5.
Figure 8:
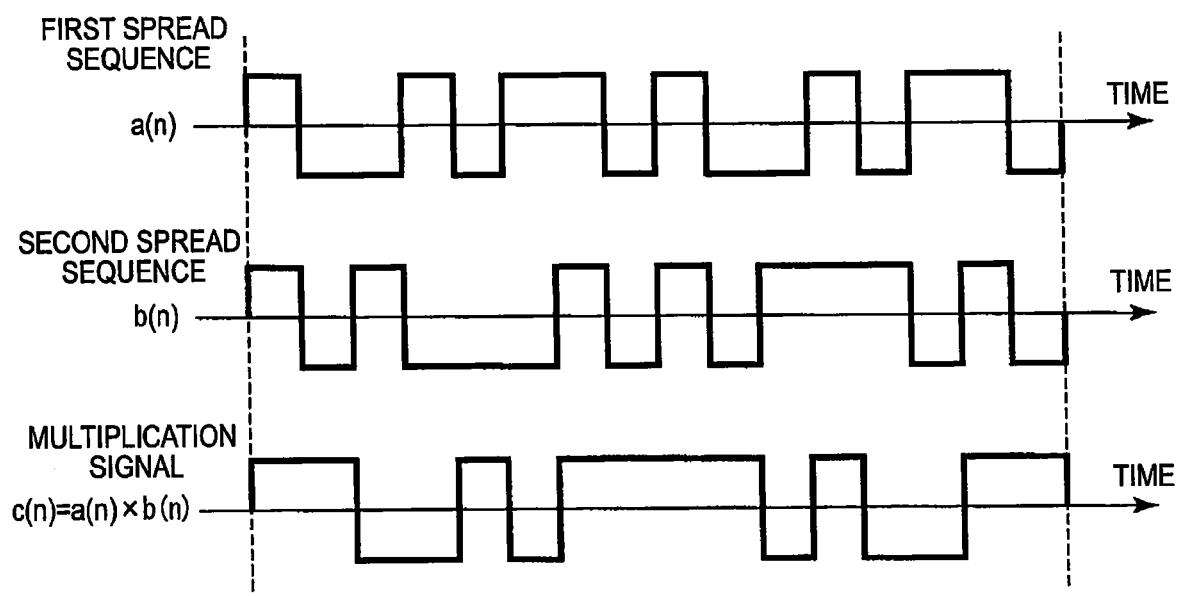
FIG. 8 is a diagram showing a time waveform of a multiplication signal generated in the receiver shown in FIG. 5.

Because the signal at DC does not include the frequency which is used to transmit the transmission signal 117, the multiplication signal 214 is the product of the first and second spread sequences 111, 112 in the transmitter 100. As a result, as shown in FIG. 7, the product of the first and second spread sequence 111, 112 appears at DC. In FIG. 8, The first spread sequence 111 and the second spread sequence 112 are expressed as a(n) and b(n), respectively. Then, the product of the first and second spread sequence 111, 112 is expressed as c(n)=a(n)×b(n). A better sequence based on c(n)=a(n)×b(n) has a higher auto-correlation.

The multiplication signal 214 from the multiplier 204 is input into the matched filter 205. The tap coefficient setting unit 206 generates the product of the first and second spread sequences 111, 112 in the transmitter 100 as a tap coefficient 216. Since the first and second spread sequences 111, 112 is determined as the timing synchronization signal preliminarily between the transmitter 100 and the receiver 200, the tap coefficient setting unit 206 in the receiver 200 has information of the first and second spread sequences 111, 112. The tap coefficient 216 is set to the matched filter 205. The cross-correlation between the multiplication signal 214 and the tap coefficient 216 is calculated in the matched filter 205, and output as a cross-correlation signal 215. The cross-correlation signal 215 from the matched filter 205 shows a peak power when the multiplication signal 214 corresponds to the tap coefficient 216. The cross-correlation signal 215 from the matched filter 205 shows small power when the multiplication signal 214 does not correspond to the tap coefficient 216 in term of time. The cross-correlation signal 215 also shows small power, when no signal received at an antenna 201, or when a signal received from other transmitters except the transmitter 100.

The cross-correlation signal 215 from the matched filter 205 is input into the peak detector 207. The peak detector 207 keeps checking the cross-correlation signal 215 from the matched filter 205. When the peak detector 207 detects the peak of a power of the cross-correlation signal 215, the peak detector 207 outputs a peak detection signal 217. When the receiver 200 has finished receiving the transmission signal 117 including the first and second spread sequences 111, 112 from the transmitter 100, the cross-correlation signal 215 from the matched filter 205 shows a peak power because the sequence of the received signal corresponds to the tap coefficient 216. Therefore, to be detected the peak power of the cross-correlation signal 215 means that the receiver 200 acquires the timing synchronization signal (that is the transmission signal 117 in this embodiment) from the transmitter 100. The peak detection signal 217 indicates the time when the peak detector 207 detects the peak power. The time in the detection signal 217 may be shown by sample number which is incremented during receiving signal, for example, the receiver 200 has a counter (not shown) to count sample of the received signal. The receiver 200 uses the time indicated by the detection signal 217 as a base time for timing synchronization with the transmitter 100 to receive a data signal. The receiver 200 will start demodulation of receiving data signal based on the time indicated by the detection signal 217 when data signal exists following the transmission signal 117.

As described the first embodiment, the frequency which is used to transmit a timing synchronization signal is not determined preliminarily between the transmitter 100 and the receiver 200. However, according to the first embodiment, the receiver 200 can performs a timing synchronization with a transmitter 100 without the information of the frequency which is used to transmit the timing synchronization signal (that is the transmission signal 117 including the product of the first and second spread sequences 111, 112) from the transmitter 100. As a result, the receiver 200 can receive the data signal following the transmission signal 117 correctly. Moreover, the signal at DC in the multiplication signal 214 is the product of the first and second spread sequences 111, 112. The bandwidth of the signal at DC is nearly equal to the bandwidth of the first and second spread sequences 111, 112 in the transmission signal 117. Therefore, the precision of the timing synchronization achieves a reciprocal of this bandwidth of the first and second spread sequences 111, 112.

We will describe results of computer simulations below to show effect of the matched filter 205. In the simulations, a pseudo random sequence is modulated by BPSK. The number of symbols after modulation is 256, and these 256 symbols are sampled with twice rate. Then, the sampled data is added noise, and input into the matched filter 205. The matched filter 205 is set the above pseudo random sequence as the tap coefficient. The sampled data are transmitted repeatedly. The power of noise is 18 dB higher than that of the signal. Therefore, SNR (Signal and Noise Ratio) of the input signal to the matched filter 205 is −18 dB.

Figure 9:
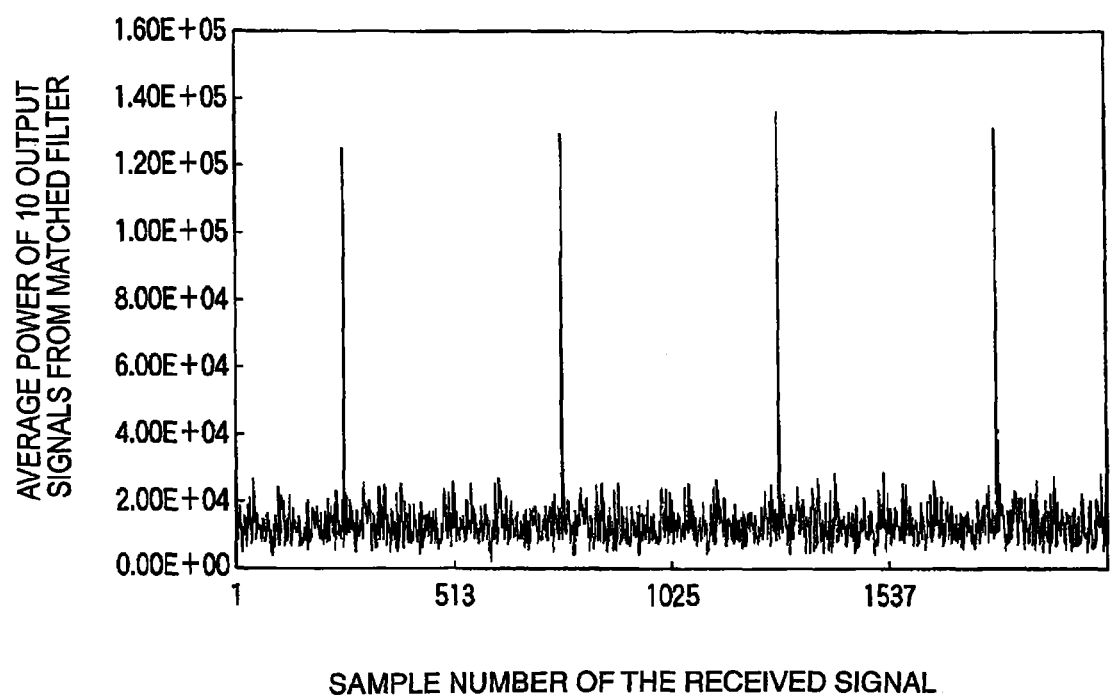
FIGS. 9, 10 and 11 are graphs showing results of computer simulations using a matched filter.
Figure 10:
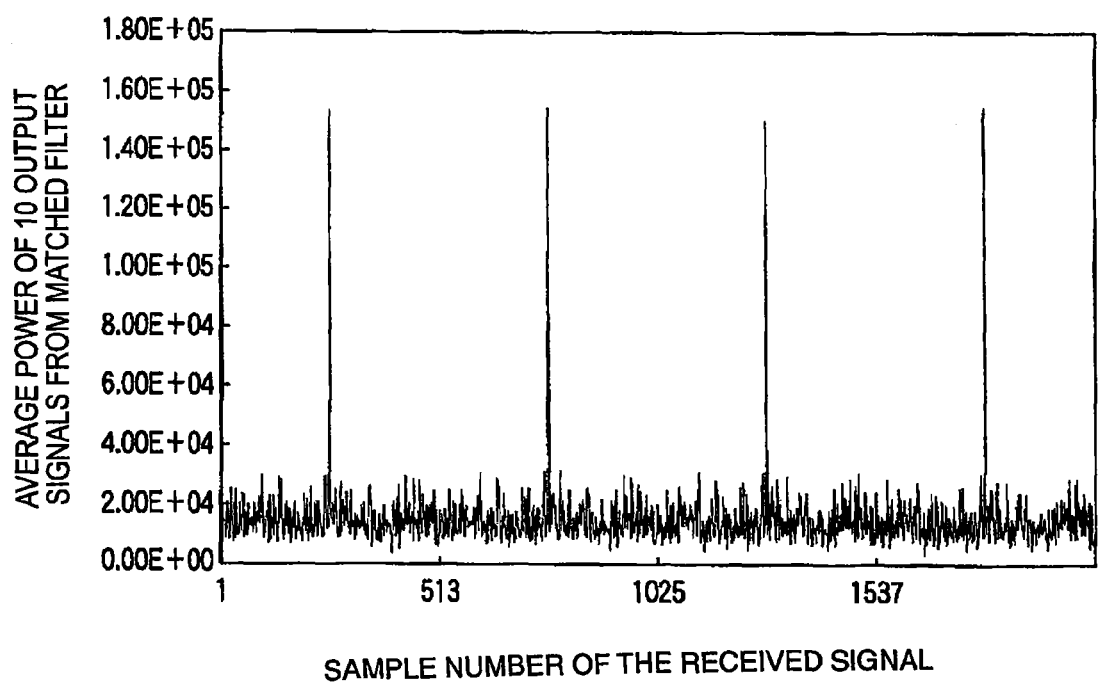
Figure 11:
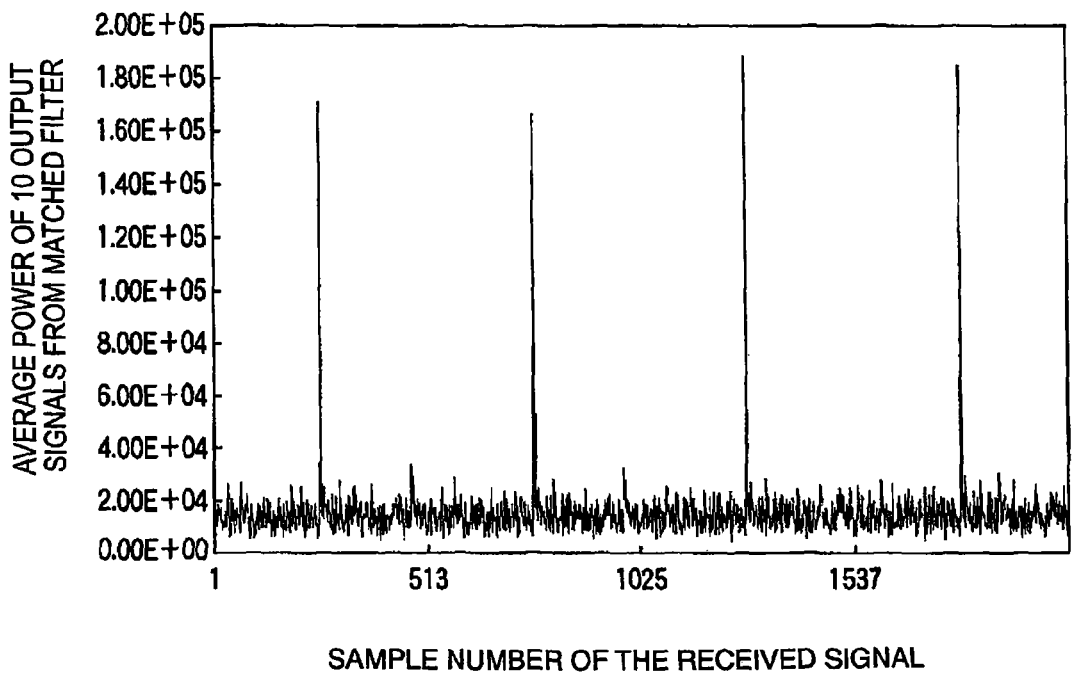

The signal is repeatedly input into the matched filter 205 ten times. Then the signal powers of these ten output signals from the matched filter 205 are all summed. This sum of the ten signal powers has been calculated at three trials. These results of three trials are shown in FIGS. 9, 10, and 11, respectively. In FIGS. 9, 10, and 11, a horizontal axis is number of a received sample signal. A vertical axis is the average power of ten output signals. As shown in FIGS. 9, 10, and 11, we can see the peak of the power clearly, because the auto-correlation of the pseudo random sequence is high.

Figure 12:
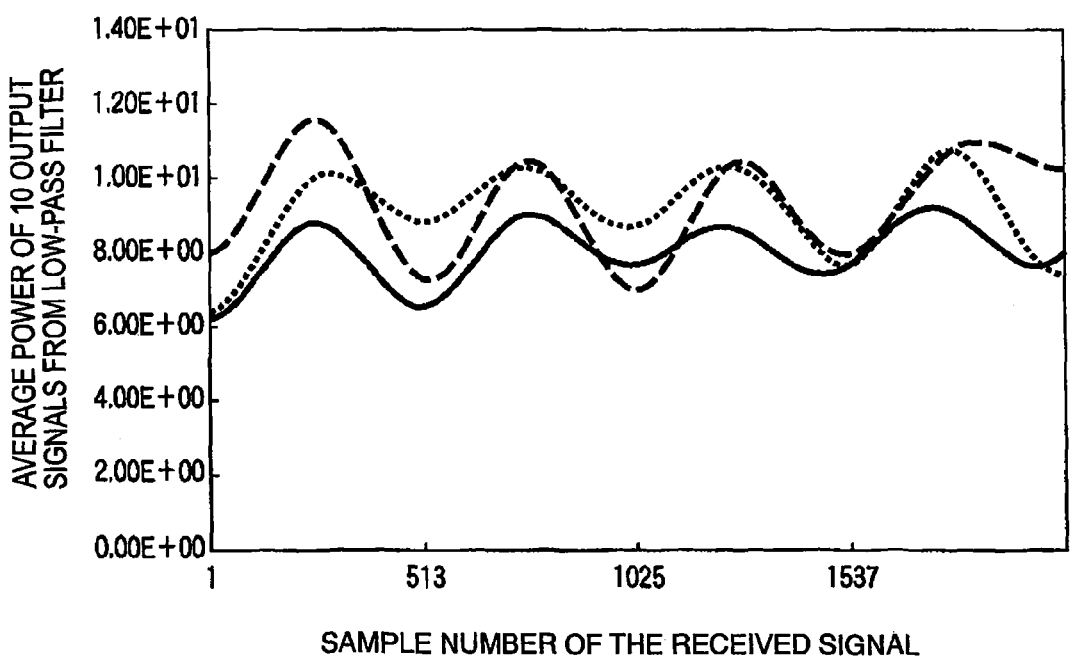
FIG. 12 is a graph showing comparative results of computer simulations using a low-pass filter.

FIG. 12 shows comparative results of 3 trials using a low-pass filter. In FIG. 12, a signal with symbol rate of 1/256 is sampled with twice of the symbol rate, and are added noise as same as FIGS. 9, 10, and 11. Then, the signal is input into the low-pass filter as described in JP-A 2008-177914(KOKAI). 10 output powers are summed in each trial. As shown in FIG. 12, each peak of average powers is not so sharp, and the position of the peak is not accurate for cycle of 512 symbols.

Both levels of peak power using the matched filter 205 and the low-pass filter are not always same. However, when using the matched filter 205, the peak is sharp and easily detected because of the high correlation of the matched filter 205. On the other hand, when using the low-pass filter, the peak is not so sharp, and it is difficult to be detected accurately. As a result, it causes an inaccuracy of the timing synchronization.

Both the first and second spread sequences 111, 112 may be M-sequence or CAZAC-sequence. Because M-sequence and CAZAC-sequence have a high auto-correlation and closed for multiplication, both sequences can keep high auto-correlation after multiplication at the multiplier 204. Therefore, when using these sequences, sharp peaks could appear in the cross-correlation signals 215 from the matched filter 205 at the receiver.

Description of the Second Embodiment

Next, the second embodiment will be explained. The second embodiment describes a method to demodulate a receiving data signal without information of the frequency which is used to transmit signal from a transmitter, in addition to the timing synchronization method described in the first embodiment.

Figure 13:
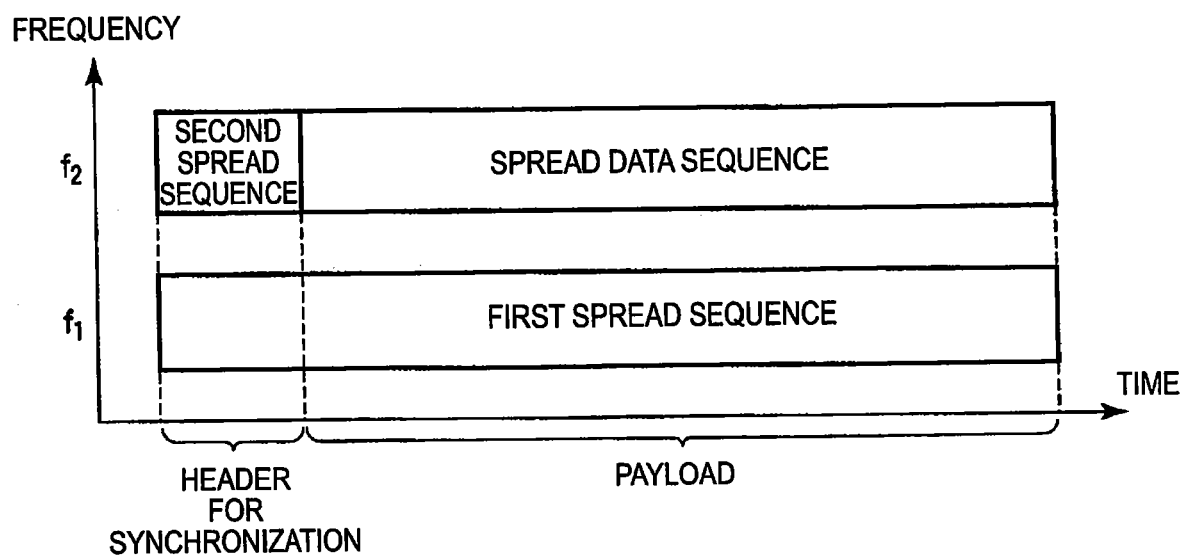
FIG. 13 shows a frame format of transmitted signal according to the second embodiment.

In the second embodiment, a transmission signal 117 in FIG. 13 includes a timing synchronization signal and data signal. The transmission signal 117 is transmitted using two frequencies f1 and f2 simultaneously from an antenna 107. The transmission signal 117 includes header for timing synchronization and payload for transmission of data. A first spread sequence 111 is transmitted using the frequency f1 during both periods of header and payload. A second spread sequence 112 is transmitted using the frequency f2 during the period of header, while the data spread by the second spread sequence 112 is transmitted using the frequency f2 during the period of payload. In the second embodiment, the payload at the frequency f2 is called as a spread data sequence 119.

Figure 14:
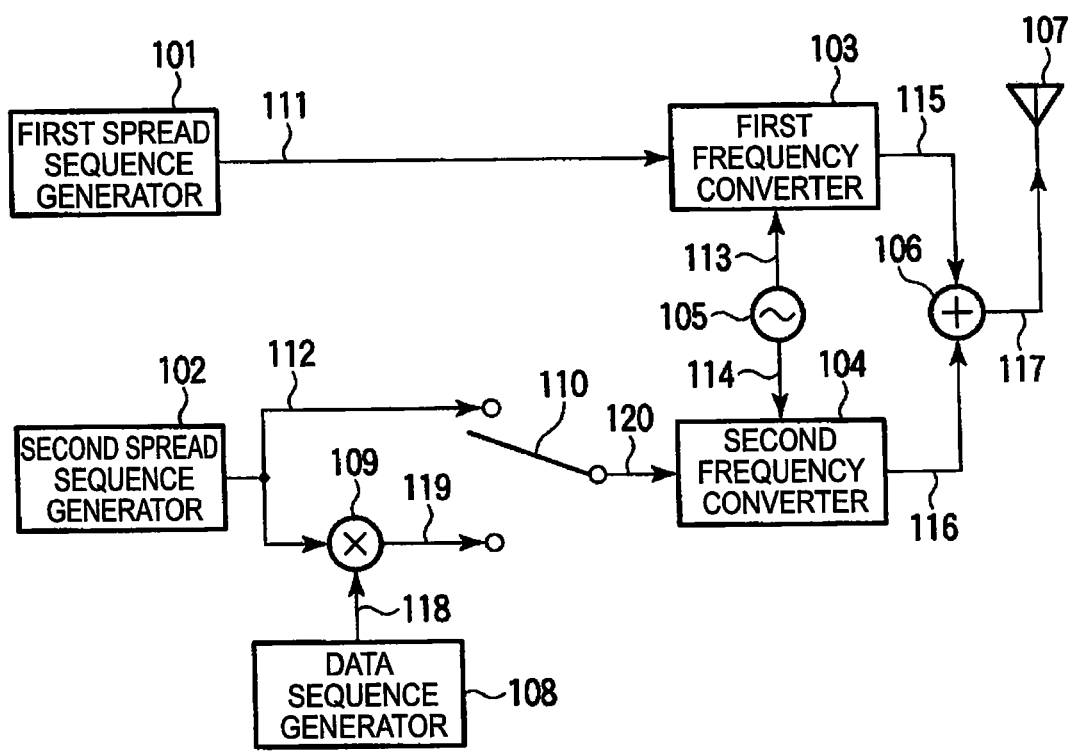
FIG. 14 is a block diagram showing a radio transmitter according to the second embodiment.

As shown in FIG. 14, the transmitter 100 has a first spread sequence generator 101, a second spread sequence generator 102, a first frequency converter 103, a second frequency converter 104, a local oscillator 105, a combiner 106, a data sequence generator 108, a multiplier 109, and a selector 110. The first spread sequence generator 101, the second spread sequence generator 102, the first frequency converter 103, the second frequency converter 104, the local oscillator 105, and the combiner 106 are same as them shown in FIG. 2 in the first embodiment.

The first spread sequence generator 101 is almost same as the first embodiment. However, a different thing from the first embodiment is that the first spread sequence generator 101 continues to generate the first spread sequence 111 not only during the period of header for synchronization but also the period of payload. Similarly, the second spread sequence generator 102 continues to generate the second spread sequence 112 not only during the period of header for synchronization but also the period of payload.

The data sequence generator 108 modulates an original data to be transmitted to the receiver 200, and outputs a modulated data sequence 118. The original data may be user data such as digitalized voice, video and text data, broadcast data such as parameters of the communication system, and control data to control the receiver 200. In the second embodiment, the bandwidth of the modulated data sequence 118 is narrower than that of the second spread sequence 112. The data sequence generator 108 stops outputting the modulated data sequence 118 during the period of header for synchronization.

The multiplier 109 multiplies the second spread sequence 112 and the modulated data sequence 118, and outputs the spread data sequence 119. The multiplier 109 stops outputting the spread data sequence 119 during the period of header for synchronization because the data sequence generator 108 stops outputting the modulated data sequence 118.

The selector 110 outputs the second spread sequence 112 as a selected signal 120 during the period of header for synchronization, or the spread data sequence 119 as the selected signal 120 during the period of payload.

The frequency of the first spread sequence 111 is converted to another frequency f1, and a first RF signal 115 is generated in the first frequency converter 103. On the other hand, the frequency of the selected signal 120 from the selector 110 is converted to another frequency f2=f1+Δf, and a second RF signal 116 is generated in the second frequency converter 104. The first RF signal 115 and the second RF signal 116 are combined to be the transmission signal 117 in the combiner 106. The transmission signal 117 is supplied to the antenna 107 and transmitted as a radio wave.

Figure 15:
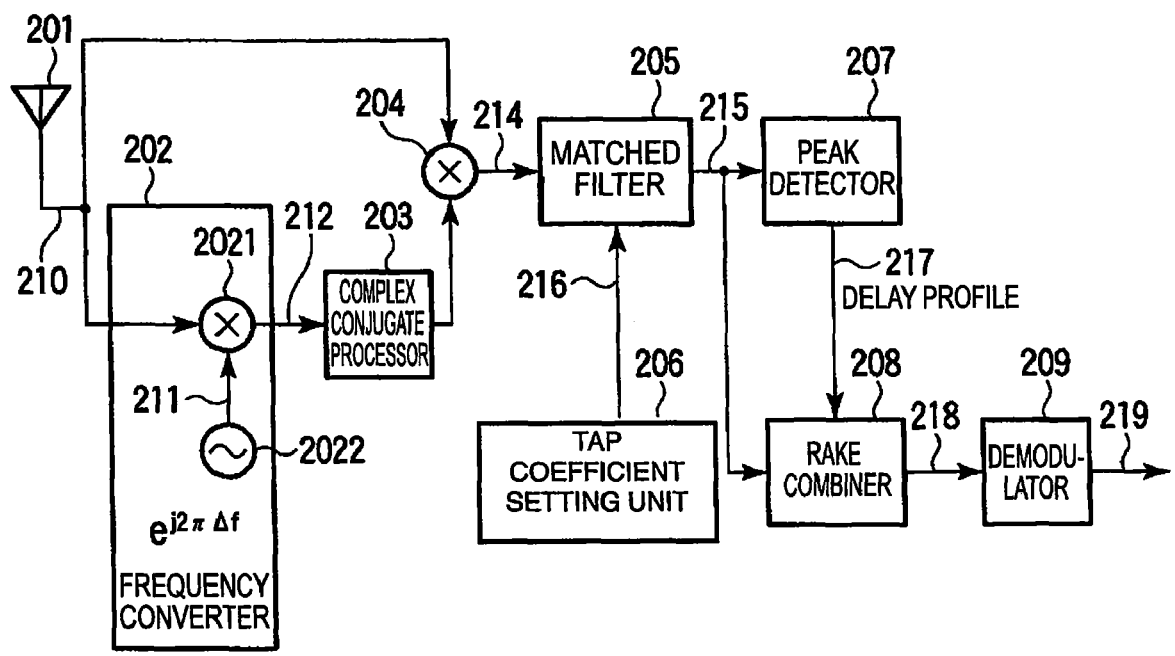
FIG. 15 is a block diagram showing a radio receiver according to the second embodiment.

Next, the receiver 200 will be described. As shown in FIG. 15, the receiver 200 includes a frequency converter 202, a complex conjugate processor 203, a multiplier 204, a matched filter 205, a tap coefficient setting unit 206, a peak detector 207, a Rake combiner 208, and a demodulator 209. The frequency converter 202, the complex conjugate processor 203, the multiplier 204, the matched filter 205, the tap coefficient setting unit 206, and the peak detector 207 are almost same as the first embodiment to operate the timing synchronization between the transmitter 100 and the receiver 200. However, the timing synchronization keeps to be operated during a receiving the payload following the header.

Since the first and second spread sequences 111, 112 are transmitted repeatedly, a peak power of the cross-correlation signal 215 from the matched filter 205 appears periodically during the period of header. On the other hand, since the spread data sequence 119, which is multiplying of the modulated data sequence 118 and the second spread sequence 112, is transmitted during the period of payload, the cross-correlation signal 215 which shows the peak power includes the modulated data sequence 118. Therefore, the original data is obtained by demodulating the cross-correlation signal 215 during the period of payload. The original data sequence may be user data such as digitalized voice, video and text data, broadcast data such as parameters of a communication system, and control data to control the receiver 200.

A received signal 210 may include plural signals such as reflected signals due to multi-path. The multi-path can be estimated by checking the cross-correlation signal 215 from the matched filter 205 according to the receiving method of CDMA signal. Some powers of delaying signals due to the multi-path appear in the cross-correlation signal 215 from the matched filter 205.

Therefore, the peak detector 207 detects plural peak powers around the highest peak power of the timing synchronization in addition to the detection of the highest peak power for the timing synchronization in the cross-correlation signal 215. Then, the peak detector 207 creates a delay profile about the plural peak powers, which may include the information of received signal number which has the peak power, the level of the peak power, and phase of the received signal on each of the received signals which have the peak power. The phase of the received signal may be used for combining signals in the Rake combiner 208. The peak detector 207 outputs the delay profile 217 into the Rake combiner 208.

The Rake combiner 208 combines plural signals which have peak power indicated by the delay profile signal 217 from the peak detector 207. It means that the powers of plural signals, which are included in the received signal 210 and distributed in time-domain due to the multi-path, are collected to get diversity gain for improving the receiving performance. The Rake combiner 208 outputs a rake combined signal 218 which is combined the plural signals. The rake combined signal 218 from the Rake combiner 208 is input into the demodulator 209. In the demodulator 209, the rake combined signal 218 is demodulated to obtain the original data. The original data is the data before being modulated to the data sequence 118 in the data sequence generator 108 of the transmitter 100, and may be user data such as digitalized voice, video and text data, broadcast data such as parameters of a communication system, and control data to control the receiver 200.

As the second embodiment, the receiver 200 realizes the timing synchronization with the transmitter 100 and demodulation of the received signal 210 without information of the frequency which is used to send the transmission signal 117.

In the first and second embodiments, we described examples of the radio communication system. Also, other embodiments of other communication system beside radio will be considered.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for communication comprising:
generating a first signal for timing synchronization;
generating a second signal for timing synchronization, which is different from the first signal;
converting frequencies of the first signal and the second signal to other frequencies to obtain a first RF signal and a second RF signal, which have a specific frequency gap therebetween;
combining the first RF signal and the second RF signal to obtain a transmission signal;
transmitting the transmission signal;
receiving the transmission signal as a received signal;
shifting the frequency of the received signal by the specific frequency gap to obtain a converted signal;
calculating a complex conjugation of the converted signal to obtain a complex conjugation signal;
multiplying the received signal and the complex conjugation signal to obtain a multiplication signal;
calculating cross-correlation between a product of the first and second signals and the multiplication signal; and
detecting a peak of the cross-correlation to set a base time for timing synchronization.

2. A method for communicating a signal including a header and a payload, comprising:
generating a first signal for timing synchronization;
generating a second signal for timing synchronization, which is different from the first signal;
generating a data signal;
multiplying the second signal and the data signal to obtain a spread data sequence;
selecting the second signal during a period of the header for synchronization, and the spread data sequence during the period of the payload as a selected signal;
converting a frequency of the first signal to another frequency to obtain a first RF signal;
converting a frequency of the selected signal to another frequency to obtain a second RF signal, which has a specific frequency gap with the first RF signal;
combining the first RF signal and the second RF signal to obtain a transmission signal;
transmitting the transmission signal;
receiving the transmission signal as a received signal;
shifting the frequency of the received signal by the specific frequency gap to obtain a converted signal;
calculating a complex conjugation of the converted signal to obtain a complex conjugation signal;
multiplying the received signal and the complex conjugation signal to obtain a multiplication signal;
calculating cross-correlation between a product of the first and second signals and the multiplication signal;
detecting a peak of the cross-correlation to set a base time for timing synchronization, and other peaks of the cross-correlation around the peak of the base time for timing synchronization;
combing the plural peaks of the cross-correlation to obtain a rake combined signal; and
demodulating the rake combined signal to obtain the data signal.

3. A transmitter comprising:
a first generator generating a first signal for timing synchronization;
a second generator generating a second signal for timing synchronization, which is different from the first signal;
a first converter converting a frequency of the first signal to another frequency with a first local signal to obtain a first RF signal;
a second converter converting a frequency of the second signal to another frequency with a second local signal to obtain a second RF signal, the second local signal has the specific frequency gap from the first local signal;
a combiner combining the first RF signal and the second RF signal to obtain a transmission signal;
a transmission unit transmitting the transmission signal;
a generator generating a data signal;
a multiplier multiplying the second signal and the data signal to obtain a spread data sequence; and
a selector selecting the second signal during a period of header for synchronization, and the spread data sequence during a period of payload as a selected signal;
wherein the second converter converts a frequency of the selected signal to another frequency to obtain the second RF signal.

4. A transmitter comprising:
a first generator generating a first signal for timing synchronization;
a second generator generating a second signal for timing synchronization, which is different from the first signal;

a first converter converting a frequency of the first signal to another frequency with a first local signal to obtain a first RF signal;

a second converter converting a frequency of the second signal to another frequency with a second local signal to obtain a second RF signal, the second local signal has the specific frequency gap from the first local signal;

a combiner combining the first RF signal and the second RF signal to obtain a transmission signal; and a transmission unit transmitting the transmission signal, wherein the first signal is a first spread sequence; and the second signal is a second spread sequence, which is different from the first spread sequence.

5. The transmitter of claim 4, wherein the first and second spread sequences are M-sequence.

6. The transmitter of claim 4, wherein the first and second spread sequences are CAZAC-sequence.

7. A receiver comprising:

a receive unit receiving a received signal, the received signal being combined a first and second RF signals which have a specific frequency gap therebetween;

a converter shifting the frequency of the received signal by the specific frequency gap to obtain a converted signal;

a processor calculating a complex conjugation of the converted signal to obtain a complex conjugation signal;

a multiplier multiplying the received signal and the complex conjugation signal to obtain a multiplication signal;

a calculation unit calculating cross-correlation between a product of the first and second signals and the multiplication signal; and a detector detecting a peak of the cross-correlation to set a base time for timing synchronization.

8. The receiver of claim 7, wherein the converter includes a local oscillator generating a local signal of a frequency which corresponds to the specific frequency gap; and a mixer converting a frequency of the received signal to another frequency with the local signal.

9. The receiver of claim 7, wherein the calculation unit includes a matched filter, which is set the product of the first and second signals as a tap coefficient, and input the complex conjugation signal;

and the calculation unit calculates the cross-correlation by using the matched filter.

10. A receiver comprising:

a receive unit receiving a received signal, the received signal being transmitted by the transmitter described in claim 4;

a converter shifting the frequency of the received signal by the specific frequency gap to obtain a converted signal;

a processor calculating a complex conjugation of the converted signal to obtain a complex conjugation signal;

a multiplier multiplying the received signal and the complex conjugation signal to obtain a multiplication signal;

a calculation unit calculating cross-correlation between a product of the first and second signals and the multiplication signal;

a detector detecting a peak of the cross-correlation to set a base time for timing synchronization, and other peaks of the cross-correlation around the peak of the base time for timing synchronization;

a Rake combiner combing the plural peaks of the cross-correlation to obtain a rake combined signal; and a demodulator demodulating the rake combined signal to obtain a data signal.

11. The receiver of claim 10, wherein the converter includes a local oscillator generating a local signal of a frequency which corresponds to the specific frequency gap; and a mixer converting a frequency of the received signal to another frequency with the local signal.

12. The receiver of claim 10, wherein the calculation unit includes a matched filter, which is set the product of the first and second signals as a tap coefficient, and input the complex conjugation signal;

and the calculation unit calculates the cross-correlation by using the matched filter.

13. The transmitter of claim 3, wherein the first signal is a first spread sequence; and the second signal is a second spread sequence, which is different from the first spread sequence.

14. The transmitter of claim 13, wherein the first and second spread sequences are M-sequence.

15. The transmitter of claim 13, wherein the first and second spread sequences are CAZAC-sequence.

* * * * *